United States Patent [19]

Stonehouse

[11] Patent Number: 5,240,219
[45] Date of Patent: Aug. 31, 1993

[54] SEAT POST CLAMP FOR BICYCLE EXERCISER

[75] Inventor: Peter A. Stonehouse, Camarillo, Calif.

[73] Assignee: Western States Import Company, Inc., Camarillo, Calif.

[21] Appl. No.: 801,362

[22] Filed: Dec. 2, 1991

[51] Int. Cl.⁵ .............................................. F16M 11/00
[52] U.S. Cl. .................................. 248/409; 297/215.13
[58] Field of Search ............ 248/423, 408, 409, 297.3, 248/295.1, 354.5; 280/281.1; 272/73; 297/195; 403/109

[56] References Cited

U.S. PATENT DOCUMENTS

| | | | |
|---|---|---|---|
| 510,993 | 12/1893 | Riess | 248/409 X |
| 2,710,207 | 6/1955 | Mueller | 297/195 X |
| 3,849,008 | 11/1974 | Boucher | 297/195 X |
| 4,150,851 | 4/1979 | Cienfuegos | 248/408 X |
| 4,872,696 | 10/1989 | Gill | 280/281.1 |
| 5,044,592 | 9/1991 | Cienfuegos | 297/195 X |

FOREIGN PATENT DOCUMENTS 19177 of 1914 United Kingdom ................ 248/408

*Primary Examiner*—J. Franklin Foss
*Attorney, Agent, or Firm*—Edward A. Sokolski

[57] ABSTRACT

A clamp has an inner end wall and a pair of opposing arms which form a U-shaped structure thereby providing a U-shaped opening in the clamp. This U-shaped structure matingly engages one end wall and the side walls of a rectangular sleeve member which is fixedly attached to the frame of a bicycle exerciser. A rectangular seat post is telescopically fitted within the sleeve member for vertical slidable adjustment relative thereto. Fixedly attached to and protruding from a recessed portion of the inner end wall of the clamp into the U-shaped opening is a pin member. Mating apertures are formed in the the end wall of the sleeve member and an end wall of the seat post through which the pin member fits. The clamp is held in position in engagement with the sleeve member by means of a spring connected between the ends of the arms thereof and the frame of the bicycle exerciser. A series of similar spaced apertures are formed along the longitudinal extent of the end wall of the seat post. The clamp can be moved outwardly against the spring tension to withdraw the pin member from the apertures and the height of the seat post adjusted as desired, the pin member then being fitted into a selected one of the longtidunally spaced apertures of the seat post to retain the post at the desired height.

7 Claims, 2 Drawing Sheets

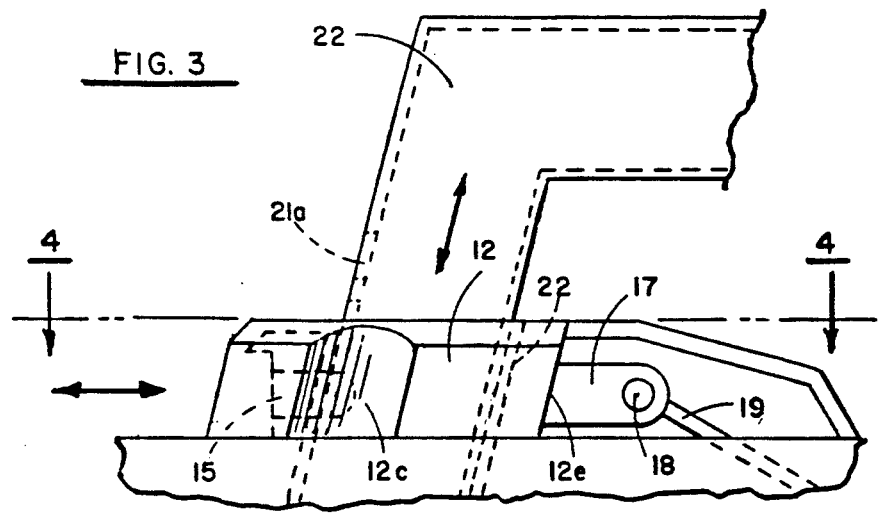
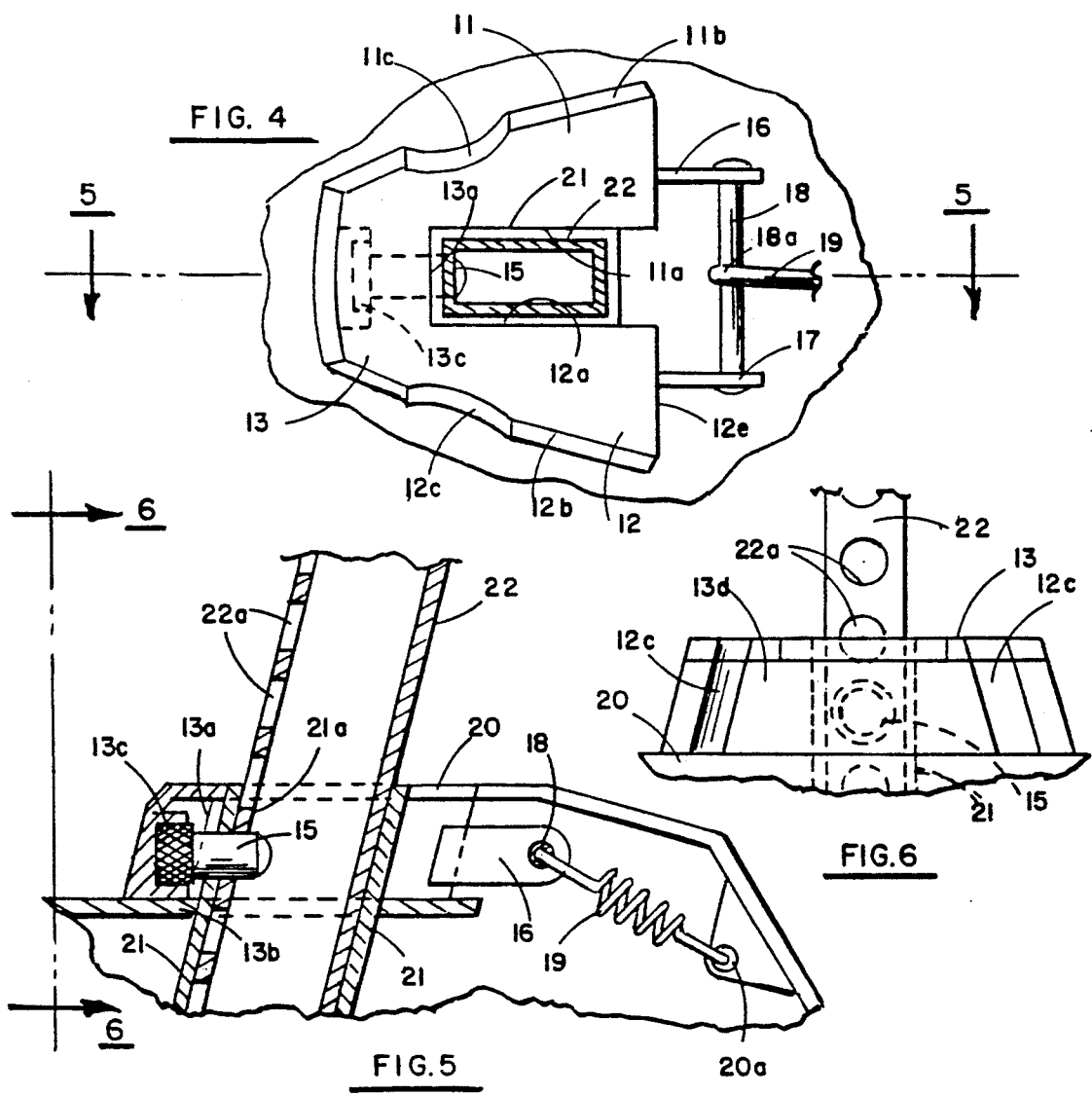

SEAT POST CLAMP FOR BICYCLE EXERCISER

BACKGROUND OF THE INVENTION

1. Field of the Invention

This invention relates to bicycle exercisers and the like and more particularly to a clamp for use in selectively setting the height of the seat post of such an exerciser.

2. Description of the Related Art

In bicycle exercisers, bicycles and the like, the height of the seat often must be adjusted to accomodate different exercise situations and different users. Thus, in such a device a convenient way to rapidly adjust the seat height is highly desirable. It is also, of course essential that the seat post be held firmly in position once it has been set to the desired height. Most prior art such devices utilize seat posts which are supported for slidable vertical adjustment with a clamping mechanism which is tightened against the seat post by means of a bolt once it is set in the desired position. A more conveniently operated type of device for achieving this end result, is described in U.S. Pat. No. 4,150,851 issued Apr. 24, 1979 to Cienfuegos and employs a spring actuated pin mechanism, the pin of this mechanism fitting into any one of a number of longitudinally spaced apertures in the seat post. While the device of Cienfuegos enables the desired rapid height adjustment, this type of device does not appear to provide as reliable retention of the seat as might be desired in a bicycle exerciser employed by persons using the exerciser for rehabilation purposes. Further, the latching mechanism employed appears to be prone to accidental actuation.

SUMMARY OF THE INVENTION

The device of the invention is a seat clamp particularly useful for adjusting the height of the seat of a bicycle type exerciser but which could be used for adjusting the height of a other types of seats. The seat clamp has of the invention has a pair of spaced apart opposing arms which extend from an end wall to form a U-shaped structure which provides a U-shaped opening. Extending inwardly into this opening is a pin member which is fixedly attached to the end wall. A spring member is connected to the ends of said opposing arms which are at the open end of the U-shaped opening. This connection is made in the preferred embodiment by hooking one end of the spring on a rod which is supported between the ends of the arms by means of a pair of brackets, the opposite end of such spring being attached to the frame of the bicycle exerciser.

The U-shaped structure of the clamp matingly engages an end wall and the side walls of a rectangular sleeve member which is attached to the frame of the bicycle exerciser. A rectangular seat post is telescopically fitted within the sleeve member for vertical slidable adjustment relative thereto. Mating apertures are formed in the sleeve member and the seat post through which the pin member of the clamp fits, the pin member being held in place in the apertures to retain the seat in position by virtue of the resilient inward urging action of the spring member. A series of similar spaced apertures are formed longitudinally along the end wall of the seat post. The clamp can be drawn outwardly against the urging action of the spring member to withdraw the pin member from the apertures and the height of the seat post adjusted as desired, the pin member then being fitted into a selected one of the longtidunally spaced apertures of the seat post to retain such post at the desired height. The side walls of the clamp, which abut against the side walls of the sleeve of the exerciser, provide reinforcement of the clamp against sidewise forces on the seat post so that such sidewise loads are borne not only by the pin member but also by the sleeve of the exerciser.

It is therefore an object of this invention to provide an improved clamp for adjustably retaining a seat on a bicycle exerciser or the like which is capable of rapid and easy operation.

It is a further object of this invention to provide a seat clamp for adjusting the height of a seat on a bicycle exerciser or he like which has improved structural characteristics.

Other objects of the invention will become apparent from the following description taken in connection with the accompanying drawings.

DESCRIPTION OF THE DRAWINGS

FIG. 3 is a side elevational view of the preferred embodiment shown installed in position on the seat post of a bicycle exerciser;

FIG. 4 is a cross sectional view taken along the plane indicated by 4—4 in FIG. 3;

FIG. 5 is a cross sectional view taken along the plane indicated by 5—5 in FIG. 4; and FIG. 6 is a rear end view taken along the plane indicated by 6—6 in FIG. 5.

DESCRIPTION OF THE INVENTION

Figure 1:
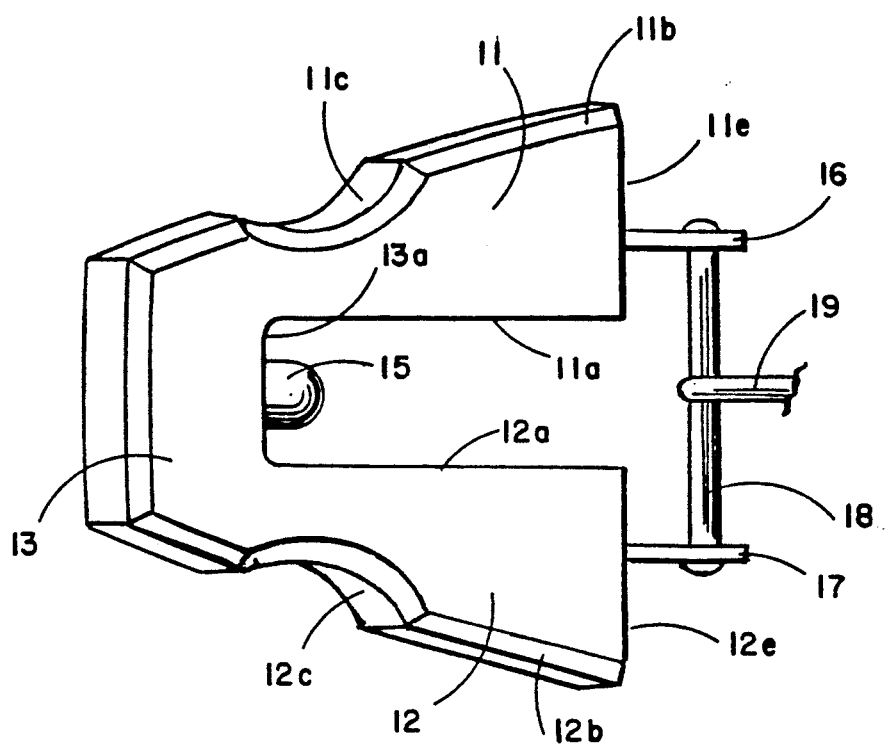
FIG. 1 is a top plan view of a preferred embodiment of the device of the invention.
Figure 2:
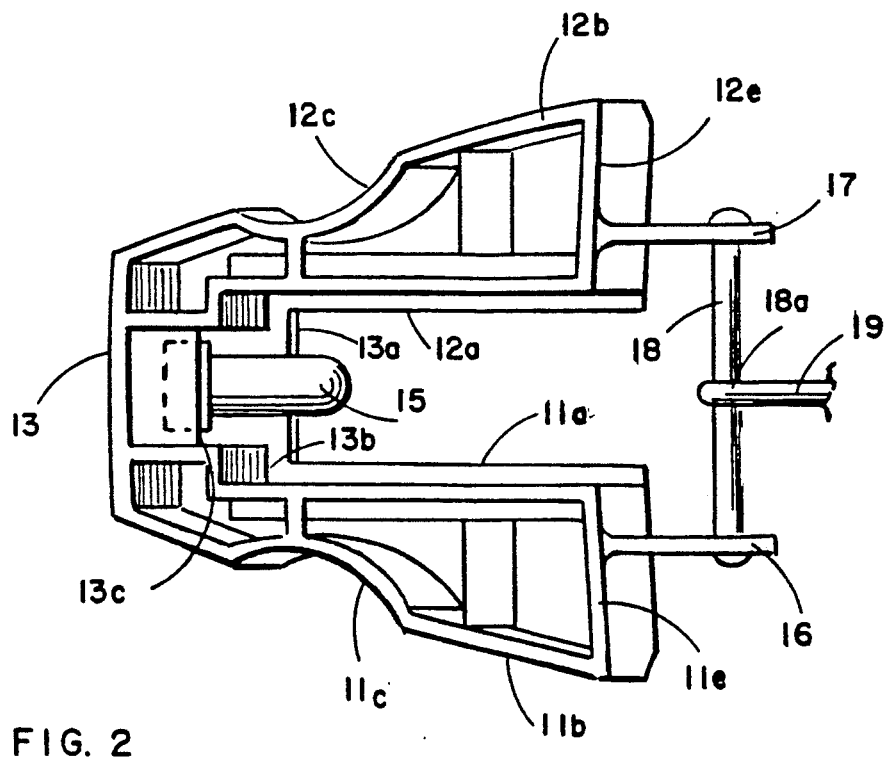
FIG. 2 is a bottom plan view of the preferred embodiment.

Referring now to FIGS. 1 and 2, a preferred embodiment of the invention is illustrated. A pair of opposing arms 11 and 12 are interconnected at one end thereof by an end wall 13 which is angled outwardly from the top surface of the clamp. The inner walls 11a and 12a of the arms are substantially parallel to each other and with the upper and lower edges 13a and 13b of the end wall form a U-shaped structure having a U-shaped opening. Cylindrical pin member 15 is fixedly attached to a recessed portion 13c of the end wall.

The outer walls 11b and 12b of the arms diverge outwardly from each other and have recesses 11c and 12c formed therein which serve as finger grips. Extending from the end walls 11e and 12e of the arms which are adjacent to the open end of the "U" formed by the U-shaped opening are a pair of brackets 16 and 17. Rod 18 is fitted in apertures in the brackets and rotatably supported thereon. Rod 18 has a grooved portion 18a formed therein in which one end of spring 19 is fitted.

Referring now to FIGS. 3-6, the clamp is illustrated in operation. The frame 20 of the bicycle exerciser has a rectangular sleeve member 21 fixedly supported thereon. Telescopically mounted within sleeve member 21 is a rectangular exerciser seat post 22 on which a seat(not shown) is supported. Post 22 fits snugly within the sleeve member with enough freedom to permit easy vertical adjustment relative thereto.

Spring 19 has one end thereof fitted in groove 18a of rod 18, the other end of the spring being fitted in aperture 20a of the exerciser frame structure. Post 22 has a plurality of apertures 22a formed therein, these apertures being spaced from each other along the longitudinal extent of the post. Pin member 15 extends through aperture 21a formed in sleeve member 21 and a selected one of the apertures 22a formed in the seat post.

The height of the seat is adjusted by using finger grips 11c and 12c to withdraw the pin member 15 from the apertures of the sleeve member and seat post against the spring tension of spring 19 and then vertically adjusting the seat post to the desired height at which one of the vertically spaced apertures 22a is located. The clamp can then be allowed to move into the apertures in response to the spring tension which holds the seat post in the new position.

While the invention has been described and illustrated in detail, it is to be clearly understood that this is intended by way of illustration and example only and is not to be taken by way of limitation, the scope of the invention being limited only by the terms of the following claims.

I claim:

1. In a device for adjusting the height of the seat of a bicycle exerciser relative to the main frame of said exerciser, said device including sleeve member fixedly supported on said frame and a hollow seat post telescopically fitted in said sleeve member for slidable vertical adjustment relative thereto, said sleeve member having an aperture formed in one wall thereof, said seat post having a plurality of vertically spaced apertures formed in one of the walls thereof directly opposite said one wall of said sleeve member, the apertures of said seat post mating with the aperture of said sleeve member, the improvement being a clamp for retaining said seat post in a selected vertical position relative to said sleeve member comprising:
   an end wall,
   a pair of spaced apart opposing arms extending from said end wall, an opening being formed between said arms,
   a pin member attached to said end wall and extending into said opening,
   said clamp being mounted on said sleeve member with the pin member fitted through the aperture of said sleeve member and a selected one of the apertures of said seat post, the inner surfaces of said end wall and said opposing arms matingly engaging the outer surfaces of said sleeve member, and
   spring means connected between said arms and the main frame of said exerciser for resiliently retaining said clamp in position on said sleeve member with the pin member thereof fitted through the aperture of said sleeve member and a selected one of the apertures of said seat post,
   whereby the clamp member can be moved laterally to withdraw said pin member from said apertures to permit vertical adjustment of said seat post to a new selected height whereat the clamp can be released against the tension of said spring means to permit said pin member to enter an aperture in said seat post corresponding to said new selected height.

2. The device of claim 1 wherein the seat post and the sleeve member are substantially rectangular, the space between the arms of said clamp being U-shaped with the inner surfaces of said arms and the inner surface of said end wall matingly engaging three of the outer surfaces of said sleeve member.

3. The device of claim 1 wherein the outer surfaces of said arms diverge from each other and from said end wall.

4. The device of claim 3 and further including recesses formed in the outer surfaces of said arms forming finger grips.

5. The device of claim 1 and further including a pair of opposing brackets each of said brackets being attached to one of said arms, a rod connected between said brackets, said spring means comprising a spring having one end thereof connected to said rod.

6. In a seat post adjustment mechanism for a bicycle type device, said mechanism including a rectangular sleeve member fixedly attached to the frame of said device and a hollow rectangular seat post telescopically fitted within said sleeve member for slidable movement relative thereto, said sleeve member having an aperture in one of the walls thereof, said post having a plurality of apertures in one of the walls thereof spaced along the vertical extent thereof, the improvement being a clamp for securing said seat post in a selected vertical position relative to said sleeve member comprising:
   an end wall,
   a pair of opposing arms extending from said end wall and forming a U-shaped opening therewith, the walls of said opening matingly engaging one end wall and the opposing side walls of said sleeve member,
   a pin member fixedly attached to the end wall and extending into said opening,
   a bracket attached to the ends of each of said arms away from said end wall,
   a rod being connected between said brackets, and
   a spring having one end thereof connected to said rod and the other end thereof connected to the frame of said bicycle type device,
   said clamping being urged by said spring against said sleeve member with said pin member extending through the aperture of said sleeve member and one of the apertures of said seat post, said clamp being movable laterally against the resilient force of said spring to withdraw said pin member from said apertures such that the height of said post can be selectively adjusted to a desired new position and the pin member permitted to reenter the aperture of said sleeve member and a newly selected aperture of said seat post.

7. The device of claim 6 wherein the outer walls of said arms diverge outwardly from each other and from the end wall.

* * * * *